United States Patent
Flannery

(10) Patent No.: US 10,785,994 B1
(45) Date of Patent: Sep. 29, 2020

(54) LACTOSE-FREE ICE CREAM

(71) Applicant: Minus the Moo LLC, Dorchester, MA (US)

(72) Inventor: Kathryn Elise Flannery, Charlestown, MA (US)

(73) Assignee: Minus the Moo LLC, Dorchester, MA (US)

( * ) Notice: Subject to any disclaimer, the term of this patent is extended or adjusted under 35 U.S.C. 154(b) by 109 days.

(21) Appl. No.: 15/782,583

(22) Filed: Oct. 12, 2017

Related U.S. Application Data

(60) Provisional application No. 62/407,180, filed on Oct. 12, 2016.

(51) Int. Cl.
*A23G 9/36* (2006.01)
*A23G 9/34* (2006.01)
*A23G 9/32* (2006.01)

(52) U.S. Cl.
CPC ............. *A23G 9/363* (2013.01); *A23G 9/327* (2013.01); *A23G 9/34* (2013.01); *A23G 2200/02* (2013.01)

(58) Field of Classification Search
CPC .................................. A23G 9/363; A23G 9/34
See application file for complete search history.

(56) References Cited

U.S. PATENT DOCUMENTS

| | | | | |
|---|---|---|---|---|
| 4,452,824 A | * | 6/1984 | Cole | A23G 9/285 426/565 |
| 5,942,264 A | * | 8/1999 | Monte | A23C 9/1206 426/42 |
| 2002/0061355 A1 | * | 5/2002 | Martin, Jr. | A23G 9/04 426/565 |
| 2007/0166447 A1 | * | 7/2007 | Ur-Rehman | A23C 9/1206 426/580 |

OTHER PUBLICATIONS

Metzger, "Rapid measurement of the lactose content of cheese whey and process cheese using a commercially available blood glucose meter," 2013, downloaded from auri.org/research-reports/rapid-measurement-of-the-lactose-content-of-cheese-whey-and-process-cheese-using-a-commercially-available-blood-glucose-meter/, 11 pages.
NIH Publication No. 14-7994, "Lactose intolerance," 2014, downloaded from https://nihpublications.od.nih.gov/PublicationDetails.aspx?PubID=7384, 15 pages.
Russell, "Butterfat and ice cream," 2009, downloaded from https://www.icecreamgeek.com/?p=113, 14 pages.

* cited by examiner

*Primary Examiner* — Jenna A Watts
(74) *Attorney, Agent, or Firm* — Fish & Richardson P.C.

(57) ABSTRACT

Lactose-free ice cream compositions, and methods for making lactose-free ice cream, are provided herein.

17 Claims, No Drawings

LACTOSE-FREE ICE CREAM

CROSS-REFERENCE TO RELATED APPLICATIONS

This application claims benefit of priority from U.S. Provisional Application Ser. No. 62/407,180, filed on Oct. 12, 2016.

TECHNICAL FIELD

This document provides ice cream formulations that are lactose-free, yet possess a texture and flavor closely resembling the texture and flavor of lactose-containing premium ice cream formulations.

BACKGROUND

While regular milk is one of the most valuable and convenient nutrients to humans, it is well known that some individuals are intolerant to lactose. Because of this problem, many people cannot tolerate milk or dairy products as a daily nutrient source.

SUMMARY

This document is based, at least in part, on the development of lactose-free, dairy-based ice cream products, and methods for making such products. As described herein, the ice cream products provided herein can be consumed by lactose-intolerant individuals without causing discomfort or illness, as the components of the formulation are treated to inactivate or remove the lactose by breaking it into its monosaccharide components.

In a first aspect, this document features a lactose-free premium ice cream that contains about 8% to about 25% milk fat by weight, about 3% to about 18% milk solids-not-fat (MSNF) by weight, about 10% to about 20% sucrose solids by weight, about 1.5% to about 6% egg yolk solids by weight, and about 35% to about 50% total solids by weight, wherein the lactose-free premium ice cream contains less than about 0.5% lactose by weight. In some cases, the lactose-free premium ice cream can contain about 10% to about 21% milk fat by weight, or about 13% to about 21% milk fat by weight. In some cases, the lactose-free premium ice cream can contain about 4% to about 6% MSNF by weight. In some cases, the lactose-free premium ice cream can contain about 13% to about 18% sucrose solids by weight. In some cases, the lactose-free premium ice cream can contain about 3.5% to about 5.5% egg yolk solids by weight, or about 4% to about 5% egg yolk solids by weight. In some cases, the lactose-free premium ice cream can contain about 35% to about 45% total solids by weight, or about 35% to about 41% total solids by weight. The lactose-free premium ice cream can contain, for example, about 13% to about 21% milk fat by weight, about 4% to about 6% MSNF by weight, about 13% to about 18% sucrose solids by weight, about 3.5% to about 5.5% egg yolk solids by weight, and about 35% to about 50% total solids by weight. The lactose-free premium ice cream can further contain a flavoring.

In another aspect, this document features a method of making a lactose-free premium ice cream. The method can include generating an ice cream base mix by combining one or more dairy liquids with egg yolks, sugar, salt, and lactase, under conditions sufficient to break down at least 99.5% of the lactose in the one or more dairy liquids, pasteurizing the ice cream base mix, optionally homogenizing the pasteurized ice cream base mix, optionally adding one or more flavorings to the ice cream base mix, and processing the pasteurized ice cream base mix into ice cream. The one or more dairy liquids can include milk and cream. The sugar can be sucrose. The method can include combining the lactase with the one or more dairy liquids prior to adding the egg yolks, sugar, and salt. The method can include incubating the lactase with the one or more dairy liquids at a temperature between about 32° F. and about 41° F. The method can include combining the lactase with the one or more dairy liquids during the pasteurizing step. The method can further include packaging the ice cream into containers, and freezing the packaged ice cream to a temperature of about −10° F. to about −30° F. In some cases, the ice cream can contain about 8% to about 25% milk fat by weight, about 3% to about 18% MSNF by weight, about 10% to about 20% sucrose solids by weight, about 1.5% to about 6% egg yolk solids by weight, and about 35% to about 50% total solids by weight. In some cases, the ice cream can contain about 13% to about 21% milk fat by weight, about 4% to about 6% MSNF by weight, about 13% to about 18% sucrose solids by weight, about 3.5% to about 5.5% egg yolk solids by weight, and about 35% to about 45% total solids by weight.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the description below. Other features, objects, and advantages of the invention will be apparent from the description and the claims.

DETAILED DESCRIPTION

This document provides an ice cream base formulation that is substantially free of lactose, yet possesses a taste, flavor, texture, and/or mouth feel comparable to that of lactose-containing premium ice cream. As conventionally used in the art (and as set forth by the FDA), the term "ice cream" refers to a food produced by freezing, while stirring, a pasteurized mix containing one or more optional dairy ingredients. Ice cream typically contains at least 10% milk fat (also referred to as butter fat) by weight, although it is to be noted that in some cases, ice cream can contain as little as 8% milk fat by weight (e.g., when the ice cream contains bulk solids such as cookie dough, nuts, or fruit, the weight percent of the milk fat may be as low as 8%). The term "premium ice cream" refers to an ice cream product that typically has a lower overrun (the amount of air pushed into the ice cream) and higher fat content than regular ice cream; premium ice cream also may include higher quality ingredients than regular ice cream. It is noted that as used herein, the term "ice cream" includes frozen custard (also called "French ice cream" or "French custard ice cream"), which typically contains a higher amount of egg yolk solids than regular ice cream.

The lactose-free ice cream provided herein can be made from real dairy ingredients that match the quality and taste of traditional premium ice cream ingredients. In general, the compositions and methods described herein utilize a mixture that includes a lactase enzyme and egg yolks, in combination with one or more dairy ingredients (e.g., milk and/or cream) and other ingredients such as, without limitation, sugar, salt, and/or one or more flavorings. In some cases, for example, an ice cream formulation as provided herein can contain, consist essentially of, or consist of cream, milk, egg yolks, sugar, salt, and lactase, and can be processed to yield a product matching the taste and texture of a traditional premium ice cream.

Lactose is the sugar naturally found in mammalian milk. Lactose is a disaccharide composed of glucose and galactose, bound together by a β-1→4 glycosidic linkage, and generally accounts for 2 to 8% of the weight of milk. The structures of lactose, glucose, and galactose are shown below.

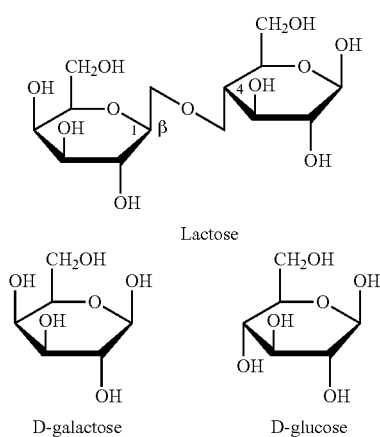

As used herein, the term "milk" refers to milk obtained from the mammary glands of mammals. Milk consumed by humans typically is obtained from mammals such as cows, goats, or sheep. The methods provided herein can be particularly suitable for the treatment of cow's milk. However, it is to be appreciated that any milk can be used. Further, the milk used in the ice cream compositions provided herein can be fat-free (skim), 1%, 2%, or whole milk. In some cases, the milk used in the ice cream can be condensed milk, evaporated milk, or reconstituted powdered milk.

Cow's milk generally is composed of about 87% water, about 5% lactose (carbohydrate), about 3.5% fat, about 3.5% protein, and 0.7% minerals (also referred to as "ash"). The protein, lactose, and ash, in combination, are referred to as the milk solids-not-fat (MSNF); it is noted that the MSNF content of the lactose-free ice cream formulations provided herein does not include lactose. Milk composition can vary depending on the species (e.g., cow, goat, sheep) from which it is obtained, the particular breed of animal (e.g., Holstein, Jersey, or Brown Swiss cows), the animal's feed, and the stage of lactation. Although there are minor variations in milk composition from animal to animal, dairy milk from different cows is stored together in bulk tanks, and the combination provides a relatively consistent composition of milk year round in the United States.

People who suffer from lactose intolerance often have impaired production of the lactase enzyme, which is responsible for breaking down lactose. See, e.g. "Lactose Intolerance" from the National Digestive Diseases Information Clearinghouse, NIH Publication No. 14-7994, 2014. About 70% of all human adults in the world show some degree of lactase deficiency, such that they do not produce any lactase, or do not produce a sufficient amount of the enzyme to break down the lactose in their diet. Lactose is digested in the intestine, where villi in the intestinal lining secrete the lactase enzyme that breaks the bond between glucose and galactose. The glucose and galactose monosaccharides are then absorbed in the intestine. If the bond between glucose and galactose cannot be broken due to, for example, an insufficient amount of the lactase enzyme, the disaccharide components will not be absorbed. This can cause symptoms such as bloating, cramping, diarrhea, flatulence, and/or other symptoms of gastrointestinal distress.

Ice cream made in the United States, unless otherwise specified, contains lactose. The presence of lactose in ice cream accounts for the sweet taste (in addition to added sugars) and plays a role in the chemical composition. Lactose also is prone to the formation of crystals, and during extended storage periods and with temperature fluctuation, lactose can form crystals that may cause a gritty, sandy, and/or coarse texture that sometimes is found in ice cream. Stabilizers (e.g., guar gum, locust bean gum, sodium carboxymethyl cellulose, alginate, carageenan, and/or xantham gum) or proteins can be used in ice cream to prevent the formation of crystals and to preserve the texture of the ice cream over its shelf life. However, the use of stabilizers in and of themselves can alter the texture of ice cream.

This document provides lactose-free ice cream formulations, as well as methods for making lactose-free ice cream. Lactose-free dairy products (e.g., milk, cream, cheese, and ice cream) can be obtained using processes such as hydrolysis, ultrafiltration, or nanofiltration. The methods provided herein, however, utilize a lactase enzyme to remove lactose from the dairy ingredients. The lactose disaccharide has a higher freezing point than glucose and galactose monosaccharides. Thus, when lactose is broken down into glucose and galactose, the freezing point of the dairy ingredients, and therefore the ice cream mix, is decreased. Given the absence or near absence of lactose, lactose crystallization is not a concern in the formulations provided herein.

The lactose-free ice cream formulations provided herein also address the issue of ice formation as a result of heat shock, which occurs when ice cream melts and then refreezes. In particular, when ice cream thaws, its basic structure changes, and water molecules that previously were separated from one another can come into contact. When the ice cream refreezes, the water molecules can form ice crystals, which can lead to an icy texture detectable to a consumer. As described below, the ice cream provided herein is formulated to include egg yolks and fat molecules in amounts that are effective to slow the melting phase that otherwise might be detrimental to a lactose-free ice cream, given the susceptibility of lactose-free products to temperature fluctuation. The inclusion of suitable amounts of egg yolks and fat can preserve the molecular structure and maintain the quality of the product for longer periods of time.

As used herein, the term "lactose-free" means that the lactose content of, for example, an ice cream formulation or a dairy component thereof (e.g., milk or cream) is about 0.5% or less by weight. Thus, a lactose-free ice cream formulation may contain no detectable lactose, or may contain lactose at a concentration that is less than about 0.50% by weight (e.g., about 0.45%, 0.40%, 0.35%, 0.30%, 0.25%, 0.20%, 0.19%, 0.18%, 0.17%, 0.16%, 0.15%, 0.14%, 0.13%, 0.12%, 0.11%, 0.10%, 0.09%, 0.08%, 0.07%, 0.06%, 0.05%, 0.04%, 0.03%, 0.02%, or 0.01% by weight, about 0.4% to about 0.5% by weight, about 0.3% to about 0.4% by weight, about 0.2% to about 0.3% by weight, about 0.1% to about 0.2% by weight, up to about 0.5% by weight, up to about 0.4% by weight, up to about 0.3% by weight, up to about 0.2% by weight, or up to about 0.1% by weight). In some cases, the dairy ingredients (e.g., milk and/or cream) utilized in the formulae provided herein can contain less than 0.50% lactose by weight (e.g., less than 0.10%, less than 0.05%, or less than 0.01% lactose by weight). Lactose can be detected and/or measured using methods such as, for example, high pressure liquid chromatography (HLPC), or using a blood glucose meter (see, e.g., Metzger, Agriculture Utilization Research Institute, 2013; available at auri.org/research-reports/rapid-measurement-of-the-lactose-content-of-cheese-whey-and-process-cheese-using-a-commercially-available-blood-glucose-meter/) or a LACTOSENS® biosensor (CHR-Hansen; Horsholm, Denmark).

In some embodiments, the formulation base mix for the ice cream compositions provided herein can include, without limitation, lactase, one or more dairy ingredients (e.g., cream and/or milk), egg yolks, sugar, and salt. Flavorings also can be added, but do not significantly contribute to the uniqueness of the end product.

In some embodiments, the lactase used in the formulations and methods described herein can be a purified and standardized liquid neutral beta-galactosidase. It is noted that the lactase should comply with recommended specification on food grade enzymes. In some cases, the lactase can be *Kluyveromyces lactis* lactase (EC 3.2.1.23). The lactase can have, for example, a minimum activity of 1900 Neutral Lactase Units (NLU)/g and/or an average activity of about 2100 NLU/g to about 5200 NLU/g (e.g., about 2100 NLU/g). The average activity can be measured in accordance with the Food Chemicals Codex (FCC), for example, using a method based on a 10 minute hydrolysis of an o-nitrophenyl-beta-D-galactopyranoside (ONPG) substrate at about 30° C. and at a pH of 6.5. The activity of the lactase can depend on a variety of factors, such as pH, temperature, dosage, time, and type of milk, for example. In the methods provided herein, the desired degree of lactose hydrolysis can be achieved by using an appropriate amount of lactase at an appropriate temperature and for an appropriate time. In some embodiments, for example, a suitable amount of lactase (e.g., about 1000 NLU/L to about 2000 NLU/L, about 2000 NLU/L to about 3000 NLU/L, about 3000 NLU/L to about 4000 NLU/L, or more than 4000 NLU/L) can be used to obtain complete or substantially complete hydrolysis of lactose, at a temperature of about 0° C. to about 5° C. (about 32° F. to about 41° F.) for about 12 to 72 hours (e.g., 12 to 24 hours, 24 to 36 hours, 36 to 48 hours, or 48 to 72 hours, or about 12, 24, 36, 48, 60, or 72 hours). In some embodiments, the lactase can be used at a high temperature, such as during Pasteurization (e.g., at about 145° F. to about 180° F., which may be carried out for about 15 seconds to about 30 minutes, or even during ultra-high temperature processing, which may be carried out for 1 to 2 seconds at about 275° F.).

In some embodiments, the dairy ingredient(s) (e.g., cream and/or milk) can be in liquid form, while in other embodiments, the dairy ingredient(s) can be powdered, evaporated, condensed, etc. Dairy in liquid form can be particularly useful for the addition of lactase, because the lactase reaction can be carried out in the natural suspension of the milk and/or cream. Further, using liquid dairy ingredients can allow the addition of lactase to be done at refrigerated temperatures, typically between about 32° F. and about 41° F. (thus, above freezing), which will not affect the composition of the fat molecules in the dairy ingredient(s) prior to pasteurization. If fat molecules are heated frequently, they may denature, preventing strong agglomeration. Thus, preserving the integrity of fat molecules can be crucial in creating a smooth mixture, since intact fat molecules typically can agglomerate more successfully and solidify the structure of the ice cream during freezing.

It is noted that to maintain the taste and texture of traditional lactose-containing premium ice cream, the same fat sources typically are used in the compositions provided herein, and lactase is used to hydrolyze lactose within those fat sources. It should be appreciated that alternative fat sources such as butter may be used, but such sources may contain a different or unknown amount of lactose as compared to milk or cream. In addition, the melting of a solid fat source (e.g., butter) can disturb the structure of the fat source, such that transitioning the solid fat source into its liquid form can alter the structure of the fat globules prior to pasteurization, which in turn could affect agglomeration. Therefore, while alternative fat sources may be included in the compositions provided herein (e.g., butter in a solid state), naturally liquid fat sources can be particularly useful to maintain lactase efficacy and fat globule structure.

Fat can play an important role in the stabilization of the ice cream, and a higher fat content can yield a higher quality ice cream product. Fat coalesces during freezing, and the degree of aggregation of the fat globules will create the foundation for shape retention. A higher fat content therefore can slow the melting rate of the final product. This can be crucial for lactose-free ice cream, since monosaccharides depress freezing points, which means that a lactose-free ice cream will require more energy to freeze and will melt more quickly than a traditional premium ice cream.

The dairy ingredients (e.g., milk and/or cream) utilized in the formulations provided herein can contain about 0.5% to about 40% fat by weight. For example, milk may contain about 0.5% to about 1%, about 1% to about 3%, about 2% to about 4%, about 3% to about 5%, up to about 1%, up to about 2.5%, or up to about 3.5% fat by weight. Cream may contain, for example, about 15% to about 25%, about 20% to about 30%, about 25 to about 35%, or about 30% to about 40% fat by weight. It is noted, however, that the milk fat content can be subject to change in order to achieve the desired texture for the ice cream product.

The percentage of milk fat in the ice cream compositions provided herein can range from about 8% to about 25% by weight. In some embodiments, for example, an ice cream formulation can have a milk fat content that ranges from about 13% to about 21% by weight, about 10% to about 21% by weight, about 8% to about 21% by weight, about 10% to about 25% by weight, about 13% to about 25% by weight, about 13% to about 15% by weight, about 15% to about 17% by weight, about 17% to about 19% by weight, about 19% to about 21% by weight, about 21% to about 23% by weight, or about 23% to about 25% by weight.

The non-fat milk solids (MSNF) present in the lactose-free ice cream compositions described herein include protein and ash, as well as the glucose and galactose products of lactose hydrolysis. The amount of MSNF in a dairy product (e.g., milk or cream) can be inversely correlated with the amount of fat, such that a higher amount of milk fat is correlated with a lower amount of MSNF, and vice versa. In some embodiments, an ice cream formulation can have a MSNF content that ranges from about 3% to about 18% by weight (e.g., about 3% to about 5%, about 4% to about 6%, about 5% to about 7%, about 6% to about 8%, about 7% to about 9%, about 8% to about 10%, about 9% to about 11%, about 10% to about 12%, about 11% to about 13%, about 12% to about 14%, about 13% to about 15%, about 14% to about 16%, about 15% to about 17%, or about 16% to about 18% by weight).

Lactose-free ice cream can be subject to a faster melt, which may be off-putting to the consumer since it is unlike a traditional premium ice cream. When lactose is broken down into glucose and galactose, the amount of free water in the suspension is reduced, which depresses the freezing point. Having less free water also can lead to a softer product, because the amount of ice crystal formation will be reduced. A less icy product is desirable to the ice cream consumer but, without the addition of a stabilizer, the ice cream would not withstand temperature variability long enough to maintain the quality and texture that typically is associated with premium ice cream. In addition, lactose-free products without a stable molecular formula would be more susceptible to heat shock during transportation, for example.

Without being bound by a particular mechanism, adding egg yolks to a lactose-free ice cream mixture can create more stability for the molecular structure of the mix by encapsulating water and air, creating a more premium product. Thus, the formulations provided herein can contain egg yolk, which can contribute to generating a lactose-free ice cream that matches the taste and texture of traditional premium ice cream. In some embodiments, the egg yolk is the only stabilizer in the lactose-free ice cream formulation, such that the ice cream can lack stabilizers such as gums, carrageenan, etc. In other embodiments, however, such stabilizers may be included.

Eggs can act as a natural stabilizer and emulsifier, and have many natural properties that can contribute to the production of a lactose-free ice cream. For example, egg yolks are categorized as a lecithin, and can bind together fat and water. Egg yolks also are phospholipid in nature, having binding properties that allow encapsulation of water and air in an ice cream mixture through agglomeration during the churning and freezing process. The encapsulated water molecules typically are more evenly dispersed throughout the product, such that their interaction with one another is substantially reduced. This reduces the formation of large ice crystals. Thus, by trapping water and air, a smoother, less icy product, and a more stable molecular structure for the ice cream can be produced.

Egg yolks can be added to the lactose-free ice cream composition in an amount that is sufficient to enable their natural properties to stabilize the mixture, resulting in a texture that more closely matches that of traditional lactose-containing premium ice cream. If the egg yolks are not present in an amount sufficient to stabilize the lactose-free ice cream, the resulting texture may be softer than that of traditional lactose-containing premium ice cream. Because egg yolks can serve as an emulsifier that allows fat particles to bind with water, they can thicken the custard and act as a bulking agent, which gives the ice cream more body and higher density. This can rectify the softness or lack of body that may occur in lactose-free ice cream.

In some embodiments, egg yolks can be present at a concentration higher than would typically be found in a French custard ice cream to create a more stable mixture that, when frozen, will match the quality and texture of a traditional premium ice cream. Traditional French custard ice creams typically contain about 1.4% egg yolk solids by weight. Thus, in some embodiments, egg yolk solids can account for about 1.5% to about 6% by weight of the ice cream base. For example, egg yolk solids can account for about 3.5% to about 5.5%, about 3.5% to about 4%, about 3.5% to about 4.5%, about 3.5% to about 5%, about 3.5% to about 6%, about 3% to about 4%, about 3% to about 4.5%, about 3% to about 5%, about 3% to about 5.5%, about 3% to about 6%, about 4% to about 4.5%, about 4% to about 5%, about 4% to about 5.5%, about 4% to about 6%, about 4.5% to about 5%, about 4.5% to about 5.5%, about 4.5% to about 6%, about 5% to about 5.5%, or about 5% to about 6% by weight of the ice cream base. It is noted that some formulations may include up to about 12% egg yolk solids by weight (e.g., about 6% to about 8%, about 8% to about 10%, or about 10% to about 12% egg yolk solids by weight).

It is noted that higher concentrations of egg yolks in combination with higher fat contents and a low overrun can contribute to a higher density product that, in turn, will melt more slowly and better retain its shape than a product containing a lower concentration of egg yolks, a lower fat content, and/or a higher overrun. The lactose-free ice cream formulations provided herein can have an overrun of, for example, about 25% to about 50% (e.g., about 25% to about 30%, about 30% to about 35%, about 35% to about 40%, about 40% to about 45%, or about 45% to about 50%).

In addition to the dairy ingredient(s), egg yolks, and lactase, the lactose-free ice cream formulations provided herein can contain sugar and/or salt, with or without other additives such as colorants and/or flavorings (e.g., vanilla, cocoa, peppermint, espresso, etc.). Ingredients such as colorants and flavorings can be added at any suitable step of the methods provided herein (e.g., before or after homogenization, or before or after pasteurization).

Suitable sugars include, without limitation, sucrose, fructose, and sugar substitutes such as sucralose, stevia, aspartame, and saccharine. The sugar solids can be present in the ice cream at an amount of about 5% to about 30% by weight (e.g., about 5% to about 10%, about 10% to about 13%, about 13% to about 15%, about 13% to about 18%, about 15% to about 17%, about 17% to about 20%, about 20% to about 25%, or about 25% to about 30% by weight).

The total amount of solids in an ice cream formulation as provided herein can range from about 30% to about 55% by weight. In some embodiments, for example, a lactose-free premium ice cream can have a total solids content of about 30% to about 35%, about 30% to about 40%, about 35% to about 41%, about 35% to about 38%, about 35% to about 45%, about 38% to about 41%, about 41% to about 45%, about 45% to about 50%, or about 50% to about 55% by weight.

In some embodiments, a formulation for a real dairy, lactose-free premium ice cream can contain:
 Milk fat: about 13% to about 21% by weight
 MSNF: about 4% to about 6% by weight
 Sucrose solids: about 13% to about 18% by weight
 Egg yolk solids: about 3.5% to about 5.5% by weight
 Total solids: about 35% to about 41% by weight.

In some embodiments, a formulation for a real dairy, lactose-free premium ice cream can contain:
 Milk fat: about 10% to about 21% by weight
 MSNF: about 4% to about 6% by weight
 Sucrose solids: about 13% to about 18% by weight
 Egg yolk solids: about 4% to about 5% by weight
 Total solids: about 35% to about 41% by weight In some embodiments, a real dairy, lactose-free premium ice cream composition can contain:
 Milk fat: about 8% to about 25% by weight
 MSNF: about 3% to about 18% by weight
 Sucrose solids: about 10% to about 20% by weight
 Egg yolk solids: about 1.5% to about 6% by weight
 Total solids: about 35% to about 41% by weight This document also provides methods for manufacturing the lactose-free premium ice cream disclosed herein. In general, ice cream prepared in accordance with the methods described herein is comparable with lactose-containing premium ice cream in terms of characteristics such as taste, flavor, mouth feel, and texture, for example.

The methods can include, for example, the following steps.

1. Obtaining raw ingredients: Raw ingredients are received and stored per food safety and regulation requirements.

2. Hydrolyzing lactose in the dairy ingredients: A sufficient amount or number of units of lactase is added to the dairy ingredients (e.g., milk and/or cream) for an appropriate time and at an appropriate temperature (e.g., per the manufacturer's instructions) to hydrolyze lactose into glucose and galactose. In some cases, for example, the lactase can be added at a relatively cold temperature such as about 41° F. or below (but above freezing), due to the efficacy of the enzyme at cooler temperatures. In other embodiments, however, the lactase can be added during pasteurization of the ice cream.

3. Pasteurization: The base mix, consisting of cream, milk, egg yolks, sugar, salt, and lactase can be pasteurized per FDA, governing body regulations. For example, all ingredients can be added to a Batch/Vat pasteurizer or HTST (High Temperature Short Time) pasteurizer. In some embodiments, egg yolks can be added in this step in an amount that results in about 3.5% to about 5.5% by weight of the total composition, or about 1.5% to about 6% by weight of the total composition. In the pasteurization process, with exposure to heat, the fat molecules can break down into smaller particles that are suitable for optimal agglomeration to form a more stable structure. At this point in this process, the dairy ingredients (e.g., milk and/or cream) are lactose-free, since the lactose has been broken down into glucose and galactose.

4. Homogenization: Once pasteurization is completed, the mix can be passed through a homogenizer to create even smaller fat molecules that will disperse throughout the mixture to agglomerate in the churning step. Homogenization is not required, but can be included for the purpose of generating smaller fat molecules that will aid in laying the foundation for a smooth, creamy texture consistent with that of traditional lactose-containing premium ice cream.

5. Addition of flavoring: If desired, the pasteurized and optionally homogenized mix can be transferred to one or more tanks where flavorings such as, without limitation, vanilla extract, cocoa, peppermint extract, or espresso, are added. The flavoring step can be executed per the capabilities of the ice cream manufacturer.

6. Processing into ice cream: The mix then can be passed through an ice cream machine available to the manufacturer. Ice cream machines include, for example, batch freezers and continuous freezers, and the method by which the mix is frozen can be dictated by the manufacturer. The composition of the mix is such that it performs like a traditional lactose-containing premium ice cream mix during the freezing process.

7. Extraction and packaging of ice cream: The ice cream can be extracted from the ice cream machine at about 15° F. to about 25° (e.g., about 20° F.), placed into one or more containers, and further frozen. Suitable freezing temperatures can range from about −10° F. to about −30° F., although it is noted that useful temperatures are not limited to this range. For example, the ice cream can be frozen at about −10° F. to about −30° F., about −30° F. to about −50° F., about −50° F. to about −100° F., about −100° F. to about −150° F., about −150° F. to about −200° F., about −200° F. to about −300° F., or about −300° F. to about −320° F.

It should be noted that aspects, embodiments and features described in the context of one of the aspects, embodiments or features of the present invention also may apply to other aspects, embodiments and features of the invention.

The invention will be further described in the following examples, which do not limit the scope of the invention described in the claims.

EXAMPLES

Example 1: Methods for Making One Gallon Recipe for a First "White" Mix

The following ingredients were used to prepare a one gallon mix:
Cream: 0.38 gallons
Skim milk: 0.4 gallons
Sugar: 1.272 pounds
Egg yolks: 0.107 gallons
Salt: 0.017 pounds
Lactase: 2.145 mL (CHR-Hansen; Horsholm, Denmark). It should be noted that the amount or units of lactase can differ based on the lactase manufacturer's instructions.

Lactose-free ice cream was prepared as follows:

1. The raw ingredients were received and stored per food safety and regulation requirements.

2. Lactase was added to the dairy ingredients per the manufacturer's instructions. Although lactase can be added during pasteurization, in this case the lactase was added at a temperature of about 32° F. to about 41° F., and the reaction was incubated for 24 hours.

3. The mixture of cream, milk, and lactase was added to a Batch/Vat pasteurizer or HTST (High Temperature Short Time) pasteurizer along with the egg yolks, sugar, and salt. The pasteurization process was executed to meet FDA, governing body regulations. The amount of egg yolks added in this step was selected to result in about 3.5% to 5.5% egg yolk solids by weight of the total composition.

4. Once pasteurization was completed, the mix was passed through a homogenizer to generate smaller fat molecules dispersed throughout the mixture.

5. When desired, the mix was then transferred to tanks where flavorings such as vanilla extract, peppermint extract, espresso, cocoa, or sea salt were added. The flavoring step was executed per the ice cream manufacturer's capabilities.

6. Once flavored, the mix was passed through an ice cream machine available to the ice cream manufacturer (typically a continuous freezer).

7. Ice cream was removed from the machine at about 20° F., placed into containers, and further frozen to a temperature of about −10° F. to about −30° F.

8. The final product composition included components within the following ranges:
Milk fat: 13% to 21% by weight
MSNF: 4% to 6% by weight
Sucrose solids: 13% to 18% by weight
Egg yolk solids: 3.5% to 5.5% by weight
Total Solids: 35% to 41% by weight Example 2: Scale Up of the First "White" Mix A 100 gallon recipe for the first "white" mix was prepared using the process described in Example 1 above, with the following amounts of ingredients:

Cream: 38 gallons
Skim milk: 40 gallons
Sugar: 127.2 pounds
Egg yolks: 10.7 gallons
Salt: 1.6 pounds
Lactase: 214.5 mL (CHR-Hansen)

Example 3: Methods for Making a One Gallon Recipe for a Second "White" Mix

The following ingredients were used to make a one gallon mix:
Cream: 0.56 gallons
Skim milk: 0.28 gallons
Sugar: 1.74 pounds
Egg yolks: 0.13 gallons
Salt: 0.01 pounds
Lactase: 2.31 mL (CHR-Hansen; this amount was subject to variance based on the manufacturer's instructions)

Lactose-free ice cream was prepared as follows:

1. The raw ingredients were received and stored per food safety and regulation requirements.
2. Lactase was added to the dairy ingredients per the manufacturer's instructions. Again, while lactase can be added during pasteurization, in this instance the lactase was added at a temperature of about 32° F. to about 41° F., and was incubated with the dairy ingredients for 24 hours.
3. The cream, milk, and lactase, along with the egg yolks, sugar, and salt, were added to a Batch/Vat pasteurizer or HTST pasteurizer. The pasteurization process was executed to meet FDA, governing body regulations. The amount of egg yolks added in this step was selected to be about 3.5% to 5.5% by weight of the total composition.
4. Once pasteurization was completed, the mix was passed through a homogenizer to generate smaller fat molecules that could disperse throughout the mixture.
5. When desired, the mix was transferred to tanks where flavorings such as vanilla extract, peppermint extract, or espresso were added. The flavoring step was executed per the ice cream manufacturer's capabilities.
6. Once flavored, the mix was passed through an ice cream machine available to the manufacturer (typically a continuous freezer).
7. Ice cream was extracted from the machine at about 20° F., placed into containers, and further frozen to a temperature typically in the range of about −10° F. to about −30° F.
8. The final product composition included components within the following ranges:
   Milk fat: 13% to 21% by weight
   MSNF: 4% to 6% by weight
   Sucrose solids: 13% to 18% by weight
   Egg yolk solids: 3.5% to 5.5% by weight
   Total solids: 35% to 41% by weight It is noted, however, that the composition can include milk fat at about 8% to 25% by weight, MSNF at about 3% to 18% by weight, sucrose solids at about 10% to 20% by weight, egg yolk solids at about 1.5% to 6% by weight, and total solids at about 35-46% by weight.

Example 4—Scale Up of the Second "White" Mix

A 100 gallon recipe for the second "white" mix was prepared using the process described in Example 3 above, with the following amounts of ingredients:
Cream: 56 gallons
Skim milk: 28 gallons
Sugar: 174.21 pounds
Egg yolks: 12.83 gallons
Salt: 1.35 pounds
Lactase: 230.88 mL (CHR-Hansen)

The formula for lactase addition was 2.75 mL of lactase per 1 gallon of dairy, with incubation for 24 hours.

Tables 1-9 show the composition of other ice cream formulations produced according to the methods described herein.

TABLE 1

| | | | | Unflavored | | | | | |
|---|---|---|---|---|---|---|---|---|---|
| Ingredient | UOM | Amount in batch | Weight | Weight % | Gallons | MSNF (weight) | Butter fat (weight) | Egg yolk solids (weight) | Total solids (weight) |
| Cream | Gallon | 240.00 | 2006.40 | 35.95% | 240.00 | 108.35 | 882.82 | | 991.16 |
| Skim Milk | Gallon | 254.00 | 2235.20 | 40.05% | 254.00 | 201.17 | 11.18 | | 212.34 |
| Granulated sugar | LBS | 800.00 | 800.00 | 14.33% | 66.67 | 0.00 | 0.00 | | 800.00 |
| Sugared egg yolks | LBS | 540.00 | 540.00 | 9.67% | 67.50 | 0.00 | 0.00 | 253.80 | 253.80 |
| Flavoring (solid) | LBS | 0.00 | 0.00 | 0.00% | 0.00 | 0.00 | 0.00 | | 0.00 |
| Flavoring (liquid) | Gallon | 0.00 | 0.00 | 0.00% | 0.00 | 0.00 | 0.00 | | 0.00 |
| | Totals | | 5582 | | 628.17 | 310 | 894 | 254 | 2257 |
| | % | | | | | 5.55% | 16.02% | 4.55% | 40.44% |
| Sweetness: | 14.33% | | | | | | | | |
| Weight per gallon: | 8.89 | | | | | | | | |

TABLE 2

| | | | | Unflavored | | | | | |
|---|---|---|---|---|---|---|---|---|---|
| Ingredient | UOM | Amount in batch | Weight | Weight % | Gallons | MSNF (weight) | Milk fat (weight) | Egg yolk solids (weight) | Total solids (weight) |
| Cream | Gallon | 240.00 | 2006.40 | 36.21% | 240.00 | 108.35 | 802.56 | | 910.91 |
| Whole Milk | Gallon | 254.00 | 2184.40 | 39.42% | 254.00 | 187.86 | 76.45 | | 264.31 |

TABLE 2-continued

| | | | | | | | Egg yolk | Total |
| Ingredient | UOM | Amount in batch | Weight | Weight % | Gallons | MSNF (weight) | Milk fat (weight) | solids (weight) | solids (weight) |
|---|---|---|---|---|---|---|---|---|---|
| Granulated sugar | LBS | 800.00 | 800.00 | 14.44% | 66.67 | 0.00 | 0.00 | | 800.00 |
| Sugared egg yolks | LBS | 540.00 | 540.00 | 9.75% | 67.50 | 0.00 | 0.00 | 253.80 | 253.80 |
| Flavoring (solid) | LBS | 0.00 | 0.00 | 0.00% | 0.00 | 0.00 | 0.00 | | 0.00 |
| Flavoring (liquid) | Gallon | 0.00 | 0.00 | 0.00% | 0.00 | 0.00 | 0.00 | | 0.00 |
| Salt | LBS | 10.40 | 10.40 | 0.19% | 0.87 | 0.00 | 0.00 | | |
| Totals | | | 5541 | | 629.03 | 296 | 879 | 254 | 2229 |
| % | | | | | | 5.35% | 15.86% | 4.58% | 40.23% |
| Sweetness: | 14.44% | | | | | | | | |
| Weight per gallon: | 8.81 | | | | | | | | |

TABLE 3

Unflavored

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Cream | Gallon | 260.00 | 2173.60 | 39.51% | 260.00 | 117.37 | 869.44 | | 986.81 |
| Whole Milk | Gallon | 230.00 | 1978.00 | 35.95% | 230.00 | 170.11 | 69.23 | | 239.34 |
| Granulated sugar | LBS | 800.00 | 800.00 | 14.54% | 66.67 | 0.00 | 0.00 | | 800.00 |
| Sugared egg yolks | LBS | 540.00 | 540.00 | 9.81% | 67.50 | 0.00 | 0.00 | 253.80 | 253.80 |
| Flavoring (solid) | LBS | 0.00 | 0.00 | 0.00% | 0.00 | 0.00 | 0.00 | | 0.00 |
| Flavoring (liquid) | Gallon | 0.00 | 0.00 | 0.00% | 0.00 | 0.00 | 0.00 | | 0.00 |
| Salt | LBS | 10.40 | 10.40 | 0.19% | 0.87 | 0.00 | 0.00 | | |
| Totals | | | 5502 | | 625.03 | 287 | 939 | 254 | 2280 |
| % | | | | | | 5.23% | 17.06% | 4.61% | 41.44% |
| Sweetness: | 14.54% | | | | | | | | |
| Weight per gallon: | 8.80 | | | | | | | | |

TABLE 4

Unflavored

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Cream | Gallon | 308.00 | 2574.88 | 47.02% | 308.00 | 139.04 | 1132.95 | | 1271.99 |
| Milk | Gallon | 154.00 | 1355.20 | 24.75% | 154.00 | 121.97 | 6.78 | | 128.74 |
| Granulated sugar | LBS | 962.50 | 962.50 | 17.58% | 80.21 | 0.00 | 0.00 | | 962.50 |
| Sugared egg yolks | LBS | 583.00 | 583.00 | 10.65% | 72.88 | 0.00 | 0.00 | 274.01 | 274.01 |
| Flavoring (solid) | LBS | 0.00 | 0.00 | 0.00% | 0.00 | 0.00 | 0.00 | | 0.00 |
| Flavoring (liquid) | Gallon | | 0.00 | 0.00% | 0.00 | 0.00 | 0.00 | | 0.00 |
| Totals | | | 5476 | | 615.08 | 261 | 1140 | 274 | 2637 |
| % | | | | | | 4.77% | 20.81% | 5.00% | 48.16% |
| Sweetness: | 17.58% | | | | | | | | |
| Weight per gallon: | 8.90 | | | | | | | | |

TABLE 5

Unflavored

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Cream | Gallon | 308.00 | 2574.88 | 48.76% | 308.00 | 139.04 | 1029.95 | | 1169.00 |
| Skim Milk | Gallon | 154.00 | 1355.20 | 25.66% | 154.00 | 121.97 | 6.78 | | 128.74 |
| Granulated sugar | LBS | 800.00 | 800.00 | 15.15% | 66.67 | 0.00 | 0.00 | | 800.00 |

TABLE 5-continued

Unflavored

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Sugared egg yolks | LBS | 540.00 | 540.00 | 10.23% | 67.50 | 0.00 | 0.00 | 253.80 | 253.80 |
| Flavoring (solid) | LBS | 0.00 | 0.00 | 0.00% | 0.00 | 0.00 | 0.00 | | 0.00 |
| Flavoring (liquid) | Gallon | 0.00 | 0.00 | 0.00% | 0.00 | 0.00 | 0.00 | | 0.00 |
| Salt | LBS | 10.40 | 10.40 | 0.20% | 0.87 | 0.00 | 0.00 | | |
| Totals | | | 5280 | | 597.03 | 261 | 1037 | 254 | 2352 |
| % | | | | | | 4.94% | 19.63% | 4.81% | 44.53% |
| Sweetness: | 15.15% | | | | | | | | |
| Weight per gallon: | 8.84 | | | | | | | | |

TABLE 6

Addition of choclate flavoring

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Cream | Gallon | 240.00 | 2006.40 | 34.47% | 240.00 | 108.35 | 802.56 | | 910.91 |
| Whole Milk | Gallon | 254.00 | 2184.40 | 37.52% | 254.00 | 187.86 | 76.45 | | 264.31 |
| Granulated sugar | LBS | 800.00 | 800.00 | 13.74% | 66.67 | 0.00 | 0.00 | | 800.00 |
| Sugared egg yolks | LBS | 540.00 | 540.00 | 9.28% | 67.50 | 0.00 | 0.00 | 253.80 | 253.80 |
| Salt | LBS | 10.40 | 10.40 | 0.18% | 0.87 | 0.00 | 0.00 | | |
| Flavoring (solid) | LBS | 271.00 | 271.00 | 4.66% | 22.58 | 0.00 | 0.00 | | 0.00 |
| Flavoring (liquid) | Gallon | 1.10 | 9.35 | 0.16% | 1.10 | 0.00 | 0.00 | | 0.00 |
| Totals | | | 5822 | | 652.72 | 296 | 879 | 254 | 2229 |
| % | | | | | | 5.09% | 15.10% | 4.36% | 38.29% |
| Sweetness: | 13.74% | | | | | | | | |
| Weight per gallon: | 8.92 | | | | | | | | |

TABLE 7

Addition of espresso flavoring

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Cream | Gallon | 240.00 | 2006.40 | 35.80% | 240.00 | 108.35 | 802.56 | | 910.91 |
| Whole Milk | Gallon | 254.00 | 2184.40 | 38.98% | 254.00 | 187.86 | 76.45 | | 264.31 |
| Granulated sugar | LBS | 800.00 | 800.00 | 14.28% | 66.67 | 0.00 | 0.00 | | 800.00 |
| Sugared egg yolks | LBS | 540.00 | 540.00 | 9.64% | 67.50 | 0.00 | 0.00 | 253.80 | 253.80 |
| Salt | LBS | 10.40 | 10.40 | 0.19% | 0.87 | 0.00 | 0.00 | | |
| Flavoring (solid) | LBS | 63.00 | 63.00 | 1.12% | 5.25 | 0.00 | 0.00 | | 0.00 |
| Flavoring (liquid) | Gallon | 0.00 | 0.00 | 0.00% | 0.00 | 0.00 | 0.00 | | 0.00 |
| Totals | | | 5604 | | 634.28 | 296 | 879 | 254 | 2229 |
| % | | | | | | 5.29% | 15.68% | 4.53% | 39.77% |
| Sweetness: | 14.28% | | | | | | | | |
| Weight per gallon: | 8.84 | | | | | | | | |

TABLE 8

Addition of mint flavoring

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Cream | Gallon | 240.00 | 2006.40 | 36.03% | 240.00 | 108.35 | 802.56 | | 910.91 |
| Whole Milk | Gallon | 254.00 | 2184.40 | 39.22% | 254.00 | 187.86 | 76.45 | | 264.31 |
| Granulated sugar | LBS | 800.00 | 800.00 | 14.36% | 66.67 | 0.00 | 0.00 | | 800.00 |

TABLE 8-continued

Addition of mint flavoring

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Sugared egg yolks | LBS | 540.00 | 540.00 | 9.70% | 67.50 | 0.00 | 0.00 | 253.80 | 253.80 |
| Salt | LBS | 10.40 | 10.40 | 0.19% | 0.87 | 0.00 | 0.00 | | |
| Flavoring (solid) | LBS | 0.00 | 0.00 | 0.00% | 0.00 | 0.00 | 0.00 | | 0.00 |
| Flavoring (liquid) | Gallon | 3.30 | 28.05 | 0.50% | 3.30 | 0.00 | 0.00 | | 0.00 |
| Totals | | | 5569 | | 632.33 | 296 | 879 | 254 | 2229 |
| % | | | | | | 5.32% | 15.78% | 4.56% | 40.02% |
| Sweetness: | 14.36% | | | | | | | | |
| Weight per gallon: | 8.81 | | | | | | | | |

TABLE 9

Addition of sea salt and vanilla flavoring

| Ingredient | UOM | Amount in batch | Weight | Weight % | Gallons | MSNF (weight) | Milk fat (weight) | Egg yolk solids (weight) | Total solids (weight) |
|---|---|---|---|---|---|---|---|---|---|
| Cream | Gallon | 240.00 | 2006.40 | 35.95% | 240.00 | 108.35 | 802.56 | | 910.91 |
| Whole Milk | Gallon | 254.00 | 2184.40 | 39.14% | 254.00 | 187.86 | 76.45 | | 264.31 |
| Granulated sugar | LBS | 800.00 | 800.00 | 14.33% | 66.67 | 0.00 | 0.00 | | 800.00 |
| Sugared egg yolks | LBS | 540.00 | 540.00 | 9.68% | 67.50 | 0.00 | 0.00 | 253.80 | 253.80 |
| Salt | LBS | 23.50 | 23.50 | 0.42% | 1.96 | 0.00 | 0.00 | | |
| Flavoring (solid) | LBS | 0.00 | 0.00 | 0.00% | 0.00 | 0.00 | 0.00 | | 0.00 |
| Flavoring (liquid) | Gallon | 3.15 | 26.78 | 0.48% | 3.15 | 0.00 | 0.00 | | 0.00 |
| Totals | | | 5581 | | 633.28 | 296 | 879 | 254 | 2229 |
| % | | | | | | 5.31% | 15.75% | 4.55% | 39.94% |
| Sweetness: | 14.33% | | | | | | | | |
| Weight per gallon: | 8.81 | | | | | | | | |

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A lactose-free premium ice cream comprising:
   about 10% to about 21% milk fat by weight,
   about 3% to about 18% milk solids-not-fat (MSNF) by weight,
   about 10% to about 20% sucrose solids by weight,
   about 3% to about 6% egg yolk solids by weight, and
   about 35% to about 50% total solids by weight,
wherein the lactose-free premium ice cream comprises less than about 0.5% lactose by weight, and wherein the ice cream does not comprise a stabilizer other than the egg yolk.

2. The lactose-free premium ice cream of claim 1, wherein the ice cream comprises about 13% to about 21% milk fat by weight.

3. The lactose-free premium ice cream of claim 1, wherein the ice cream comprises about 4% to about 6% MSNF by weight.

4. The lactose-free premium ice cream of claim 1, wherein the ice cream comprises about 13% to about 18% sucrose solids by weight.

5. The lactose-free premium ice cream of claim 1, wherein the ice cream comprises about 3.5% to about 5.5% egg yolk solids by weight.

6. The lactose-free premium ice cream of claim 1, wherein the ice cream comprises about 4% to about 5% egg yolk solids by weight.

7. The lactose-free premium ice cream of claim 1, wherein the ice cream comprises about 35% to about 45% total solids by weight.

8. The lactose-free premium ice cream of claim 1, wherein the ice cream comprises about 35% to about 41% total solids by weight.

9. The lactose-free premium ice cream of claim 1, wherein the ice cream comprises:
   about 13% to about 21% milk fat by weight,
   about 4% to about 6% MSNF by weight,
   about 13% to about 18% sucrose solids by weight,
   about 3.5% to about 5.5% egg yolk solids by weight, and
   about 35% to about 50% total solids by weight.

10. The lactose-free premium ice cream of claim 1, further comprising a flavoring.

11. A method of making a lactose-free premium ice cream, comprising:
   generating an ice cream base mix by combining one or more dairy liquids with egg yolks, sugar, salt, and lactase, under conditions sufficient to break down at least 99.5% of the lactose in the one or more dairy liquids;
   pasteurizing the ice cream base mix;
   optionally homogenizing the pasteurized ice cream base mix;

optionally adding one or more flavorings to the ice cream base mix; and processing the pasteurized ice cream base mix into ice cream, wherein the ice cream comprises about 10% to about 21% milk fat by weight, about 3% to about 18% MSNF by weight, about 10% to about 20% sucrose solids by weight, about 3% to about 6% egg yolk solids by weight, and about 35% to about 50% total solids by weight, and wherein the ice cream does not comprise a stabilizer other than the egg yolk.

12. The method of claim 11, wherein the one or more dairy liquids comprise milk and cream.

13. The method of claim 11, wherein the sugar is sucrose.

14. The method of claim 11, comprising combining the lactase with the one or more dairy liquids prior to adding the egg yolks, sugar, and salt.

15. The method of claim 14, comprising incubating the lactase with the one or more dairy liquids at a temperature between about 41° F. and about 32° F.

16. The method of claim 11, further comprising packaging the ice cream into containers, and freezing the packaged ice cream to a temperature of about −10° F. to about −30° F.

17. The method of claim 11, wherein the ice cream comprises:
about 13% to about 21% milk fat by weight,
about 4% to about 6% MSNF by weight,
about 13% to about 18% sucrose solids by weight,
about 3.5% to about 5.5% egg yolk solids by weight, and
about 35% to about 45% total solids by weight.

* * * * *